United States Patent [19]

Gentry et al.

[11] Patent Number: 5,778,180
[45] Date of Patent: Jul. 7, 1998

[54] MECHANISM FOR REDUCING DATA COPYING OVERHEAD IN PROTECTED MEMORY OPERATING SYSTEMS

[75] Inventors: Denton E. Gentry, Palo Alto; Rasoul M. Oskouy, Fremont, both of Calif.

[73] Assignee: Sun Microsystems, Inc., Mountain View, Calif.

[21] Appl. No.: 554,608

[22] Filed: Nov. 6, 1995

[51] Int. Cl.[6] .................................................. G06F 13/14
[52] U.S. Cl. ............................... 395/200.42; 395/842
[58] Field of Search ............................. 395/200.2, 250, 395/200.07, 842, 846, 848, 200.42; 370/412, 392, 395

[56] References Cited

U.S. PATENT DOCUMENTS

| 5,289,470 | 2/1994 | Chung | 370/429 |
|---|---|---|---|
| 5,347,634 | 9/1994 | Herrell | 395/843 |
| 5,355,453 | 10/1994 | Row | 395/200.49 |
| 5,491,808 | 2/1996 | Geist | 395/427 |
| 5,530,902 | 6/1996 | McRoberts | 395/848 |
| 5,590,313 | 12/1996 | Reynolds | 395/500 |
| 5,619,647 | 4/1997 | Jardine | 395/200.01 |
| 5,633,867 | 5/1997 | Ben-Nun | 370/399 |
| 5,640,399 | 6/1997 | Rostoker | 370/392 |
| 5,666,514 | 9/1997 | Cheriton | 711/144 |

Primary Examiner—Tod R. Swann
Assistant Examiner—Christopher Chow
Attorney, Agent, or Firm—Blakely Sokoloff Taylor & Zafman

[57] ABSTRACT

A method and an apparatus for reducing data copying overhead associated with protected memory operating systems. In an ATM (Asynchronous Transfer Method) network, the present invention's NIC (network interface circuit) demultiplexes the information in the header of the incoming packet and routes the packet directly to its final destination using the present invention's concept of targeted buffer rings. Thus, instead of having the packet be DMA'd to a buffer in a descriptor ring in the kernel, it may be routed directly to the buffer ring of the destination process.

29 Claims, 13 Drawing Sheets

MECHANISM FOR REDUCING DATA COPYING OVERHEAD IN PROTECTED MEMORY OPERATING SYSTEMS

BACKGROUND OF THE INVENTION

(1) Field of the Invention

The present invention is related to the method and apparatus for data transfer into a kernel in memory. More specifically, the present invention is related to a method and an apparatus for reducing data copying overhead in protected memory operating systems.

(2) Description of Related Art

Memory as related to a computer is typically all of the addressable storage space in a processing unit and other internal storage that is used to execute instructions. It is well known that computer systems include host memory, typically a number of data buffers of an arbitrary byte size residing within a predetermined address range. These data buffers are uniquely addressed within the predetermined address range to allow selective access to data for subsequent processing or transmission. Data buffers may be arranged in a circular ordering as part of a buffer ring in memory.

A protected memory operating system does not allow any program to access any data memory in the computer system. Application programs are highly restricted in the memory they are allowed to access. When packets arrive from a network, they are generally placed in a buffer which is not accessible by the destination program. To make the receive packet available to the destination program, it must be copied into memory which is accessible to the program. This copying of data represents a great deal of the overhead in computer networking. Thus, it is a great disadvantage of the prior art method and apparatus, that received packets are placed in kernel buffers which are not immediately available to the destination process.

FIG. 1 illustrates the method and apparatus of a traditional approach to data access for a protected memory operating system. Kernel 103 has receive ("RX") descriptor ring 100 with descriptors to buffers K1, K2 and K3 102. User process A 105 has buffers A1 and A2 106. User process B 107 has buffers B1 and B2 108. Once a packet arrives, the router typically assigns one of the buffers 102 out of a free pool of buffers through its descriptor on kernel 103's descriptor ring 100 and DMA's the packet into the buffer. Once kernel 103 has the packet in buffer 102, the kernel determines the destination of the packet from its routing information. For example, the kernel may determine that the packet is destined for user process A 105. User process A 105 has it's own buffers 106. Kernel 103 copies the data from the packet in buffer 102 byte-by-byte into user process A 105's buffer 106.

FIG. 2 illustrates the general steps followed by an exemplary implementation of the prior art method and apparatus. References are made to the elements illustrated in FIG. 1. In step 201, an incoming packet arrives. In step 202, router grabs buffer K1 through a descriptor on the descriptor ring in the kernel. In step 203, router then DMA's the packet into buffer K1. In step 204, the kernel decodes the packet header and determines that the packet is destined for user process A. In step 205, the kernel then copies the packet data from buffer K1 to A1. The incoming packet data is thus transmitted to its final destination.

With ATM networks a packet has a Virtual Circuit identifier, which is unique between a particular source and destination. The router typically looks at this VC during its per packet processing. A significant disadvantage of the prior art method and apparatus is that all packets are addressed to a single destination address, and thus must be DMA'd to the same buffer ring in the kernel.

It is therefore desirable to have a method and an apparatus which reduces the data copying overhead associated with protected memory operating systems. Such method and apparatus would increase overall system performance.

BRIEF SUMMARY OF THE INVENTION

A method and an apparatus for reducing data copying overhead associated with protected memory operating systems are disclosed. In an ATM (Asynchronous Transfer Method) network, the present invention's NIC (network interface circuit) demultiplexes the information in the header of the incoming packet and routes the packet directly to its final destination using the present invention's concept of targeted buffer rings. Thus, instead of having the packet be sent to an intermediate buffer in a descriptor ring in the kernel, it may be routed directly to the buffer ring of the destination process.

In an ATM network, a packet is divided into cells. Each cell has an arbitrary size (for example, forty-eight bytes of data) and has a built in header referenced as VCI's (Virtual Channel Identifier). The VCI's typically have the routing information indicating the destination address of a packet. When a packet arrives, the router picks up a buffer through its corresponding descriptor from a pool of protected descriptors, for example, a descriptor ring. The router then writes the data into the buffer by DMA and notifies the kernel that the packet has arrived. The kernel then looks up the header of the packet and tells the final destination that the packet has arrived.

Because multiple VCI's are available and the router is able to decode these VCI's, the router may also perform the demultiplexing of the information in the header of a given packet. In packet switching, a VCI is a facility provided by a network which gives the appearance to the user of an actual connection. Packet switching is a process of routing and transferring data by means of address packets so that a channel is occupied only during transmission of a packet. VCI's allow physical transmission facilities to be shared by many users simultaneously. Typically, on completion of the transmission, the channel is made available to transfer of other packets.

More specifically, each ATM connection may have a private pool of buffers, into which only packets for that connection will be placed. Since the pool of buffers is private, a program can be given access to its own pool. No data copying will be required for packets received into the private pool. Therefore, a packet may be directly sent to its final destination by DMA. Additionally, protected buffer descriptors prevent corruption of data with the private buffers dedicated to the data's final destination. When a packet arrives, if there are no private buffers available, the router falls back to a common pool of buffers which are not available to the programs and thus, must be copied. Since not all connections will be able to use private buffer pools due to lack of resources, a change in the connection from the common pool of buffers to the private pool of buffers and vice versa is available. This change affects a connection while it operates. The change takes effect on the next packet to arrive.

The method and apparatus of the present invention therefore reduces the data copying overhead associated with protected memory operating systems and increases overall system performance.

DETAILED DESCRIPTION OF THE INVENTION

A method and an apparatus for data transfer reducing the data copying overhead associated with protected memory operating systems. In an ATM (Asynchronous Transfer Method) network, the present invention's NIC (network interface circuit) demultiplexes the information in the header of the incoming packet and routes the packet directly to its final destination using the present invention's concept of targeted buffer rings.

With the present invention, the software may select a more efficient routing of the packet to its final destination. Addressing is performed at several different levels. More specifically, at the ATM layer there is a VCI in every cell header. The router used as the VCI to determine which targeted buffer to read or write by DMA. Inside the packet is another set of headers with another set of address, typically Internet Protocol (IP) addresses. The router never looks at the IP address. Since there are multiple VCI's coming into a host, there can be multiple targeted buffer rings and multiple user processes can receive their data with no copying.

Thus, instead of having the packet be sent to a buffer by DMA corresponding to a descriptor on the kernel's descriptor ring, the software may route the packet to a different buffer ring. The software may be used to designate in advance that a particular buffer ring in the kernel points to buffers already in the final destination. Thus, when a packet arrives, the router selects a descriptor pointing to a buffer already in the packet's final destination, writes the data into that buffer by DMA and notifies the kernel that the packet has arrived. The kernel then looks up the header of the packet and tells the final destination that the packet is in the final destination. The method and apparatus of the present invention therefore reduces the data copying overhead associated with protected memory operating systems and increases overall system performance.

Figure 1:
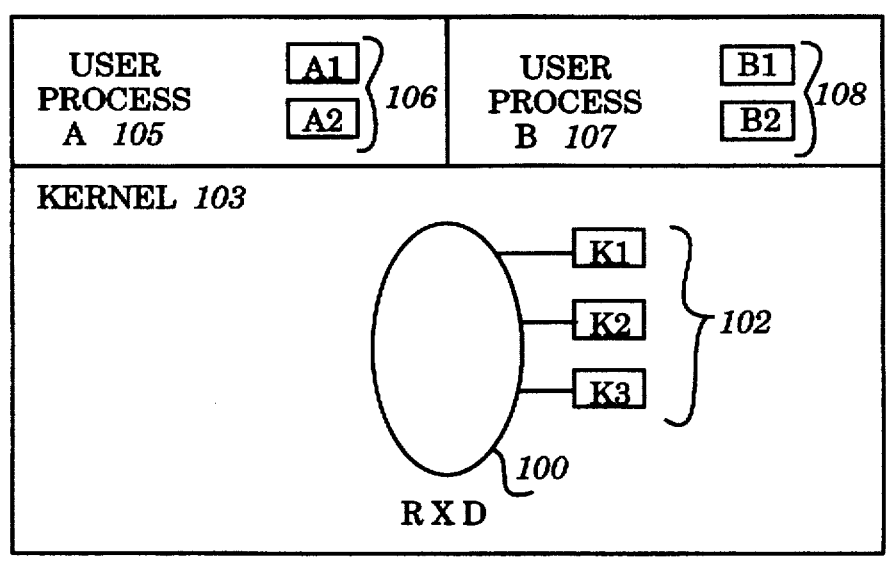
FIG. 1 illustrates the method and apparatus of a traditional approach to data access for protected memory operating systems.
Figure 2:
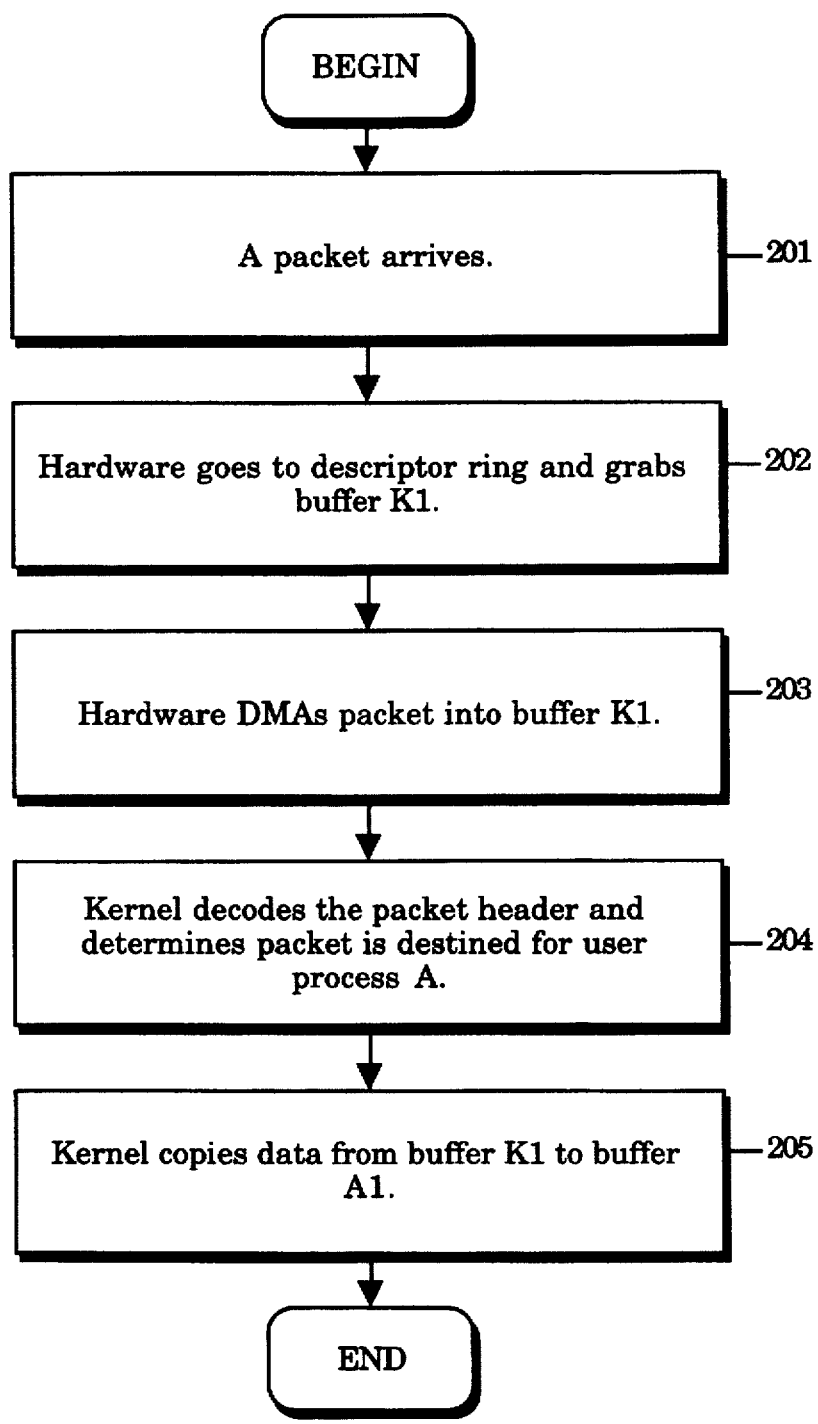
FIG. 2 illustrates the general steps followed by an exemplary implementation of the prior art method and apparatus (references are made to elements illustrated in FIG. 1).
Figure 3:
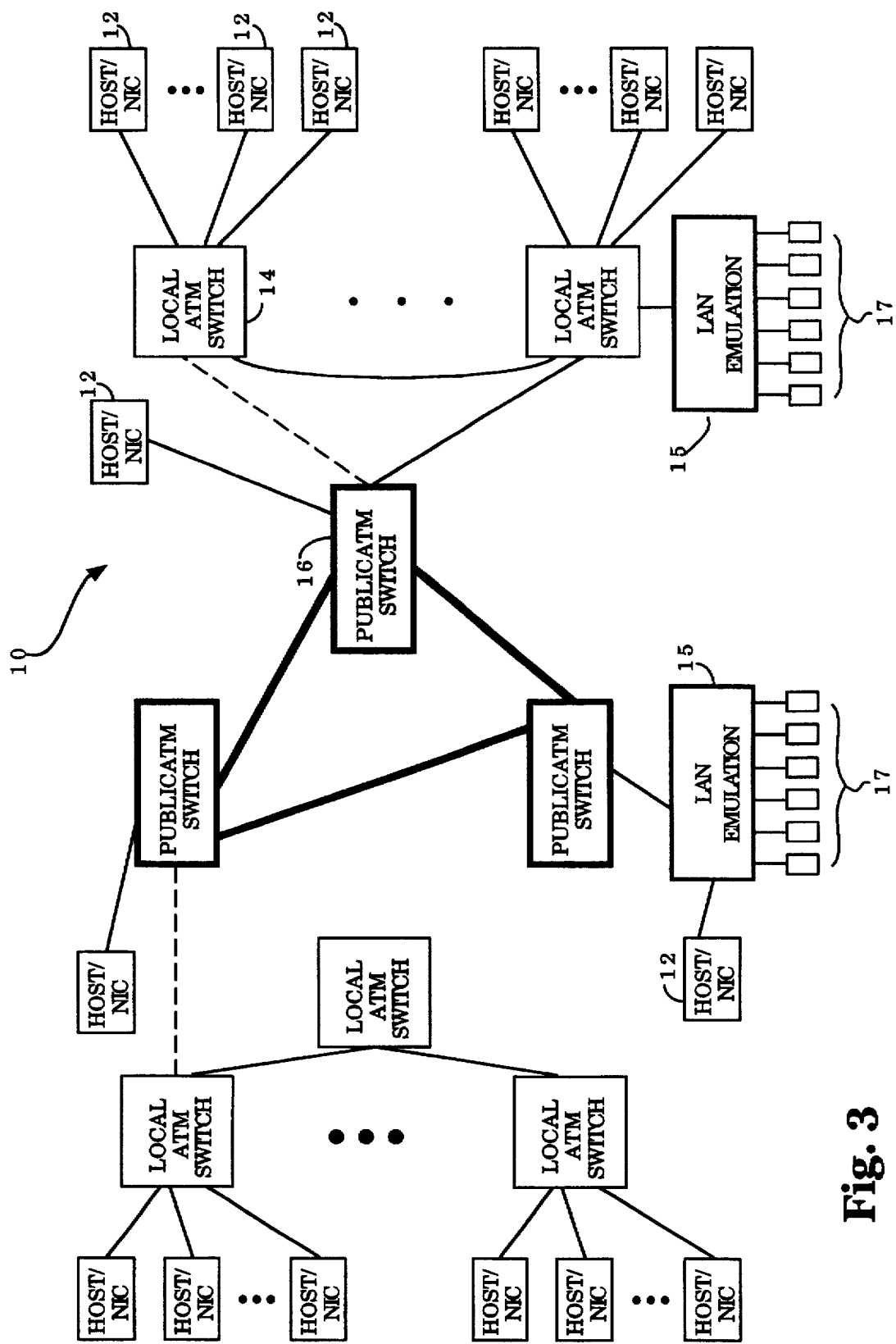
FIG. 3 illustrates an exemplary computer system network incorporating the ATM network interface circuit which utilizes the method and apparatus of data access of the present invention.

FIG. 3 illustrates an exemplary computer system network incorporating a ATM network interface circuit (NIC) which utilizes the method and apparatus for reducing data copying overhead of the present invention. The computer system network 10 includes host computer systems (not shown) which incorporate one or more of the ATM network interface circuits (NICs) 12. The NICs 12 are coupled to a public ATM switch 16 through a local ATM switch 14 to enable asynchronous transfer of data between host computer systems coupled to the network 10. Alternately, the NICs 12 can be coupled directly to the public ATM switch 16. As shown in FIG. 3, the computer system network 10 may also include computer systems which incorporate the use of a Local Area Network ("LAN") emulation 15 which serves as a gateway for connecting other networks such as Ethernet or token ring networks 17 which utilize the ATM network as a supporting framework.

Figure 4:
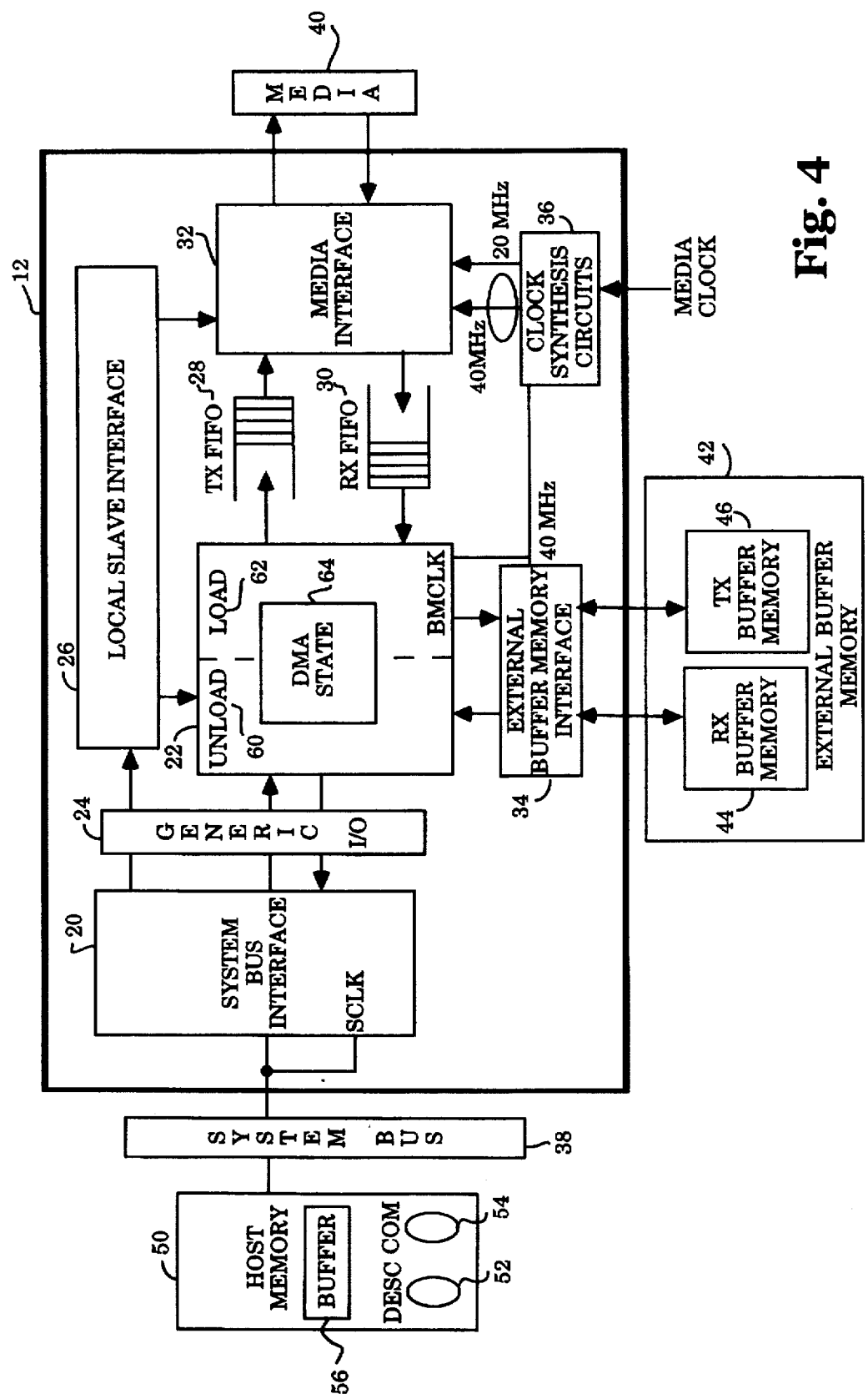
FIG. 4 is a simplified system diagram illustrating the architecture of the ATM NIC of FIG. 3.

FIG. 4 is a simplified system diagram illustrating the architecture of the ATM NIC 12 of FIG. 3. The ATM NIC 12 interfaces the host computer system coupled through system bus 38 to the network media 40 operating in accordance with the ATM protocol.

The ATM NIC 12 shown includes a System Bus interface 20, a Generic Input/Output ("GIO") interface 24, a System and ATM Layer Core 22, a Local Slave interface 26, an array of transmit (TX) FIFOS 28, an array of receive (RX) FIFOS 30, a Media interface 32, an External Buffer Memory Interface 34 and clock synthesis circuit 36.

Together, the elements 20–36 of network interface circuit 12 cooperate to asynchronously transfer data between the host computer and the other computers in the network through multiple, dynamically allocated channels in multiple bandwidth groups. Collectively, the elements of the network interface circuit 12 function as a multi-channel intelligent direct memory access (DMA) controller coupled to the System Bus 38 of the host computer system. In a preferred embodiment, multiple transmit and receive channels are serviced as virtual connections utilizing a full duplex 155/622 Mbps physical link. Multiple packets of data, subscribed to different channels over the System Bus 38 to the external buffer memory 42, via the External Buffer Memory Interface 34, are segmented by the System and ATM Layer Core 22 into transmit cells for transmission to the Media 40 through Media interface 32.

The Core 22 also comprises reassembly logic to facilitate reassembly of the receive packets. The TX and RX FIFOS 28, 30, coupled between the Core 22 and the Media Interface 32, are used to stage the transmit and receive cell payloads of the transmit and receive packets respectively. The Media Interface 32 transmits and receives cells to the Media 40 of the network, driven by clock signals provided by Clock Synthesis Circuit 36. Preferably the Media, and therefore the Media interface 32, conforms to the Universal Test and Operations Physical Interface for ATM ("UTOPIA") standard, as provided by the ATM Forum Ad Hoc specification. To conform to the UTOPIA specification, the clock synthesis circuit 36 provides either a clock signal of 20 MHz or 40 MHz to enable the Media interface 32 to support a byte stream at 20 MHz for 155 Mbps or a 16 bit stream at 40 MHz for a 622 Mbps data stream.

In the present embodiment, the Media Interface 32 receives 52-byte data cells each having a 4-byte cell header and a 48-byte payload from the TX FIFO 28. The Media Interface 32 inserts a checksum as a fifth byte to the cell header into each cell prior to providing the 53-byte data cell to the Media 40. Conversely, when the Media Interface 32 receives cells from the Media 40, it examines the checksum in the fifth byte of each cell to determine if the checksum is correct. If so, the byte representing the checksum is stripped from the cell and the cell is forwarded to the RX FIFO 30. Otherwise, the entire cell is dropped.

The network interface circuit 12 also shields the cell delineation details of asynchronous transfer from the applications running on the host computer system. For present purposes, it is assumed that applications running on the host computer system manage transmit and receive data using wrap around transmit and receive rings with packet interfaces. However, the present invention may be practiced with the applications running on the host computer system managing transmit and receive data using other data structures.

The System Bus Interface 20 and Generic I/O interface 24 insulate the host computer system from the specifics of the transfer to the Media 40. Furthermore, the Core 22 is insulated from the specifics of the system bus 38 and host data structure. In the presently preferred embodiment, the System Bus is an S-Bus, as specified in the Institute of Electronics and Electrical Engineers ("IEEE") standard 1496 specification. The System Bus Interface 20 is configured to communicate in accordance with the specifications of the system bus, in the present illustration, the S-Bus.

It is contemplated that the System Bus Interface 20 can be configured to conform to different host computer system busses. The System Bus Interface 20 is also configured to transfer and receive data in accordance with the protocols specified by the Generic I/O interface 24. The Generic I/O interface 24 provides a singular interface through which the Core 22 communicates with the host computer. Thus, the Core 22 does not change for different embodiments of the NIC 12 which interface to different host computer systems and busses.

Host memory 50 with descriptor ring 52 and completion ring 54 is coupled to system bus 38. Host memory 50 may receive packets from media 40 through NIC 12. Once the packet is in host memory 50, the software acknowledges the received packet and reads from descriptor ring 52. Once the software has the DMA state, it begins moving the data in the packet into buffer 56 and places the DMA state back on completion ring 54.

In a preferred embodiment, once an incoming packet with, for example, forty-eight byte cells of data and five bytes of header arrive, the router processes the header, looks at the VCI (Virtual Circuit) field in the cell. The appropriate header and VCI information including whether the information is target or non-target, is written into DMA state 64 in NIC 12. DMA state 64 in system core 22 determines whether the VCI information should be discarded or whether it should be tacked on to other cells which arrived with the VCI. Load 62 then moves the forty-eight bytes of data of the packet out into receive ("RX") buffer memory 44 in external buffer memory 42. Once there is enough data in DMA state 21 to route the packet into the appropriate location in host memory 50, RX unload 60 unloads the cells from RX buffer memory 44 in external buffer memory 42. The router then begins writing the data directly to its final destination in host memory 50 by DMA if the packet is destined to a target buffer. Otherwise, the packet is DMA'd to a non-target buffer in host memory 50. The present invention therefore increases overall system performance by providing the ability to directly writing data to its final destination by DMA. A more detailed description of this process is described in FIG. 6 and the accompanying description. The following description accompanying FIG. 5 provides a more detailed description of target and non-target buffers available through RX free target data descriptor rings and RX free non target data descriptor ring of host memory 50.

Figure 5:
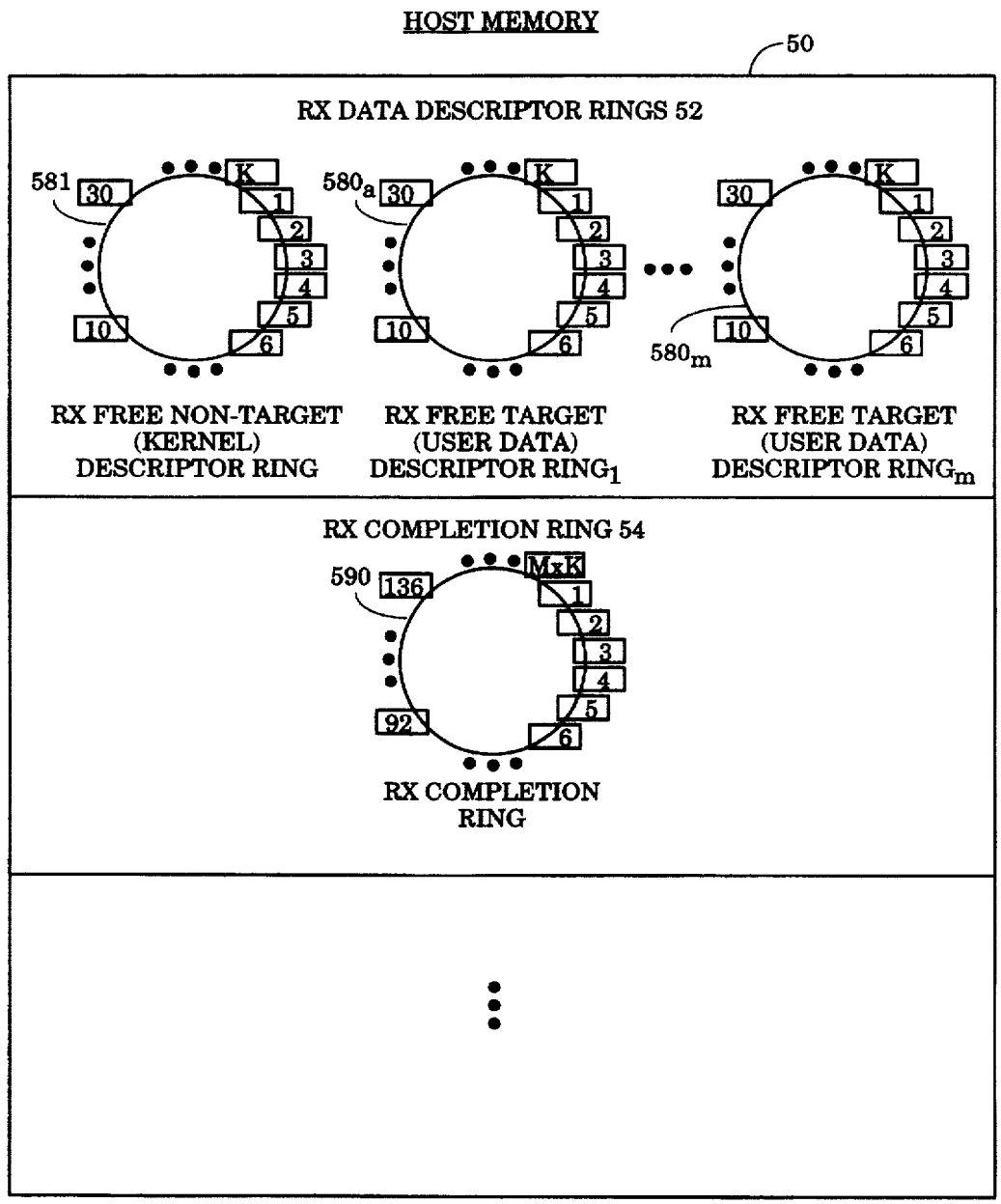
FIG. 5 is a general overview of the preferred data structure of the host memory used for data reception.

FIG. 5 is a general overview of the preferred data structure of the host memory used for data reception. The host memory includes receive ("RX") free target (user data) data descriptor rings 580a–580m, RX free non-target (kernel) descriptor ring 581 and RX completion ring 590. A packet arriving from media 40 and processed through NIC 12 is loaded into a buffer corresponding to a descriptor in a target or a non-target descriptor ring described herein.

In a presently preferred embodiment, RX free target (user data) data descriptor rings 580a–580m and RX free non-target (kernel) descriptor ring 581 are two different types of RX free buffer descriptor rings. Each VC (virtual circuit) subscribes to one of the two types. RX free non-target (kernel) descriptor ring 581 is a common free buffer pool which could be utilized by multiple VC's. RX free target (user data) data descriptor rings 580a–580m provide per VC dedicated free buffer pool. The VC subscribing to the common free buffer pool is referred to as non-targeted VC's and the VC dedicated free buffer pool is known as targeted VC's. The present invention's reduction in the data copying overhead of a protected memory operating system is enabled in part by the present invention's target buffers available through RX free target data descriptor rings 580a–580m. Since the target buffers are dedicated to each VC, a packet being sent to host memory 50 may be directly sent to the target buffer of the packet's final destination by DMA. The data and protocol header splitting is supported by both targeted and non-targeted VC's.

The RX free target (user data) descriptor rings 580a–580m are data structures corresponding in number to multiple channels, usually of different transfer data rates, supported by network interface circuit (NIC) and to the RX data buffers, respectively. Each RX target data descriptor ring 580a–580m includes a plurality "K" of ring entries 585, numbered "1" to "K", which are accessed by software sequentially and in a circular fashion. The value of "K" is a whole number preferably at least equal to sixty-four. Each ring entry is of a sufficient size (e.g., 64 bytes) to provide storage for a "data descriptor" which include a header and a data pointer to a location in its respective RX data buffer where a desired data packet is located. Thus each receive channel programmed as a target channel would have its own free buffer ring. There will be up to 1,024 free buffer rings for up to 1,024 target connections. When a particular channel runs out of free buffer and a packet arrives, the router will access the common free buffer pool to retrieve a free buffer. Free target data ring uses "OWN" bit for descriptor ownership.

There is one common RX free non-target data ring 581 primarily to store packets for multiple receive channels which have been programmed as non-target channels. Non-target channels are normally utilized for packets destined to kernel space such as NFS (network file system). RX free non-target descriptor ring 581 may also be utilized as an auxiliary buffer pool when the individual target channels (channels which are tied directly to user application) run out of free buffers. In an exemplary embodiment, there are two buffer pointer entries per descriptor. One buffer pointer is utilized to store the protocol header and the other for the data portion of the packet. The header buffers and data buffers are limited to 2048 bytes and 64 k bytes respectively. RX free non-target data ring 581 utilizes an "OWN" bit for descriptor ownership.

RX completion ring 590 is a data structure having a plurality of ring entries which, unlike RX data descriptor rings 580a–580m, contain all necessary information in the ring entry rather than relying on pointers. The received data packets for multiple channels are reported in a single RX completion ring 590 both for targeted and non-targeted VC's. In a preferred embodiment, the RX completion ring 590 occupies 64 k bytes of host memory through 1,024 ring entries being on 64 byte boundaries. The RX completion ring 590 is accessible by both software and router requiring an OWN bit in each descriptor which is set when the NIC has ownership of the RX completion ring 590.

Figure 6:
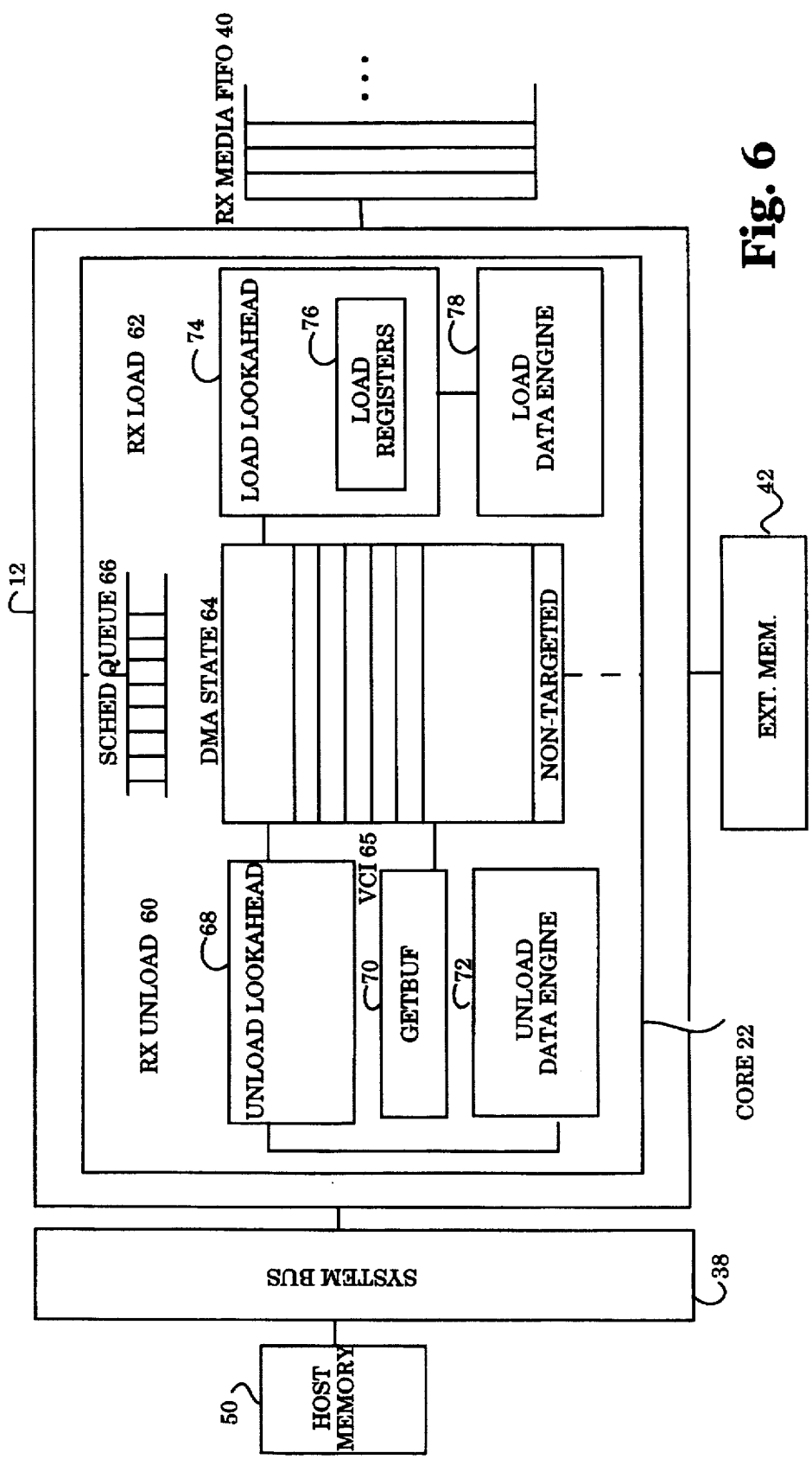
FIG. 6 illustrates the receive RX unload, the DMA state and the RX load of system core illustrated in FIG. 4.

FIG. 6 illustrates the receive RX unload, the DMA state and the RX load of core in more detail. References are made to elements in FIG. 4. In the presently preferred embodiment, core 22 of network interface circuit 12 (NIC) has RX unload 60, schedule queue 66, DMA state 64 and receive RX load 62. Unload look-ahead 68 and get_buffer 70 are coupled to DMA state 64 on the RX unload 60 side. Data engine 72 is coupled to unload look-ahead 68. On the RX load 62 side, load look-ahead 74 has register header 76 and is coupled to load data engine 78 and DMA state 64.

RX load 62, RX unload 60 and DMA state 64 process information on each packet and assures that when NIC 12 is unloading the packet to host memory 50, that the packet is sent directly to its final destination. More specifically, when RX unload 60 is unloading data to host memory 50, it needs to retrieve a buffer in host memory 50 for the packet. Information regarding whether a particular VCI is set up to be targeted or non-targeted is indicated in DMA state 64. If the VCI is targeted, the router may pick up the buffer for VCI 65 from one of the RX target data descriptor rings 580a–580m in host memory 50. These RX target data descriptor rings 580a–580m may point directly to the buffer of a packet's final destination. Otherwise, if DMA state 64 indicates that the particular VCI is non-targeted, then a buffer from the non-targeted (kernel) buffer ring 581 from host memory 50 is obtained. Once a buffer is picked up, the router saves the buffer information including the pointer to the data buffer in DMA state 64. Other information it saves in DMA 64 includes how large the buffer is and how much information has already been sent to it by DMA.

Once it is determined where in host memory 50 the information is supposed to be transferred to, RX unload 60 retrieves the cell from external buffer memory 42 and transmits the cell to the destination in host memory 50. This continues until the end of the packet arrives. The router then takes all the DMA state information including buffer pointer, CRC (Cyclical Redundancy Check) and writes the information to completion ring 54 in host memory 50. The router then generates an interrupt which wakes up the software so that the software may look at completion ring 54 in host memory 50 for the packet's DMA state information. The software may retrieve the packet information from completion ring 54 and is able to determine whether a particular packet transferred to host memory 50 is in a targeted buffer or whether it is in a non-targeted buffer. The software may also conclude which VCI the packet is targeted to or destined to and may look up the buffer table which contains the kernel address of the packet. The software then notifies the final destination of the packet that the packet has arrived at that destination.

Figure 7A:
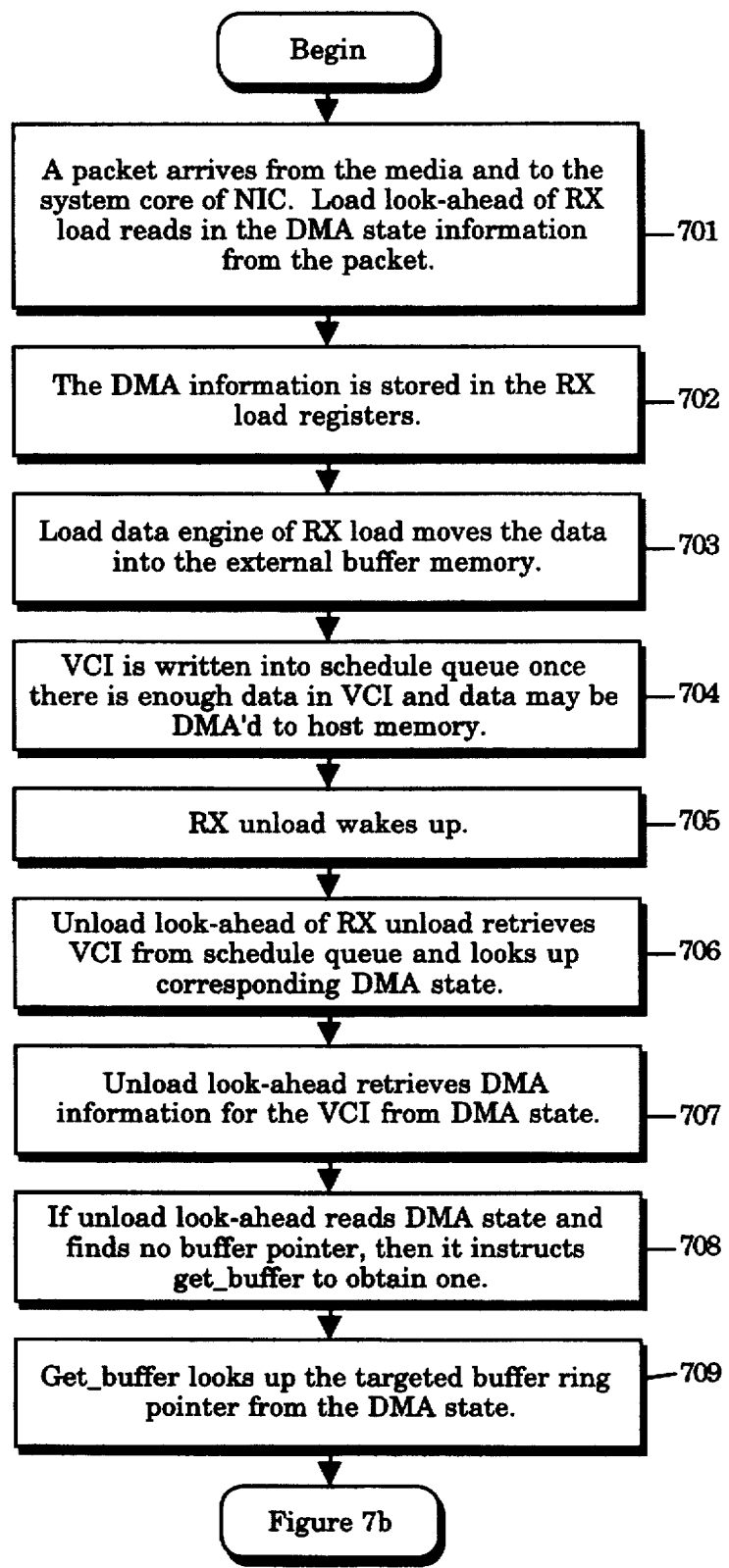
FIGS. 7a and 7b are flow diagrams illustrating the general steps followed by an exemplary implementation of the present invention.
Figure 7B:
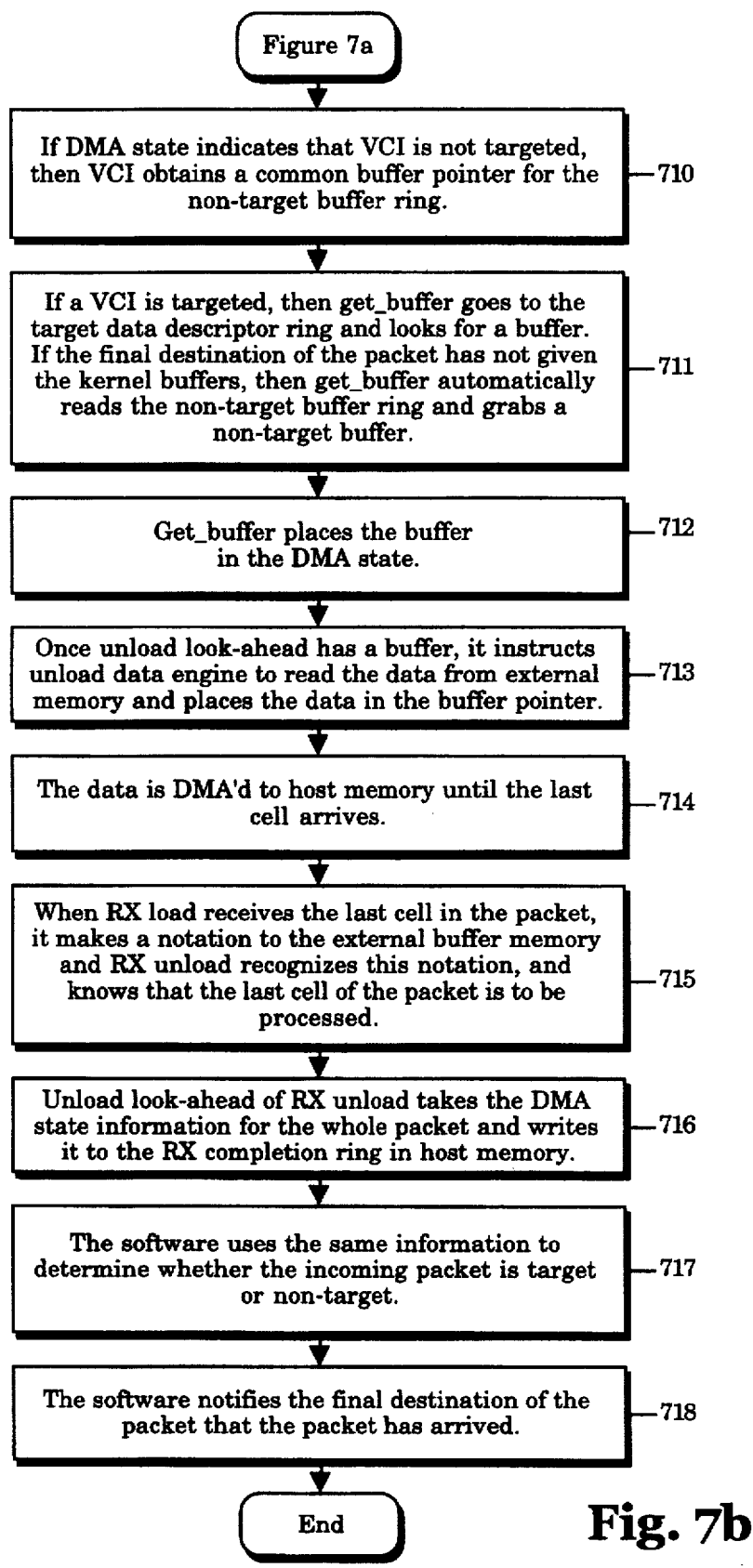

FIGS. 7a and 7b are flow diagrams illustrating the general steps followed by an exemplary implementation of the present invention. References are made to elements in FIG. 6. In step 701, data in the form of cells of a packet arrives to NIC 12. The cells have a header portion and the data portion. In system core 22 of NIC 12, load look-ahead 74 of RX load 62 reads in the DMA state information of a cell including the pointer used to move the data of the packet cell into external buffer memory 42 and the CRC that is calculated so far over the data from the header. In step 702, the DMA information is then stored in the registers.

In step 703, RX load 62 instructs load data engine 78 to move the data into external buffer memory 42. Once load data engine 78 moves the data, it informs load look-ahead 74 that it is done. If RX load 62 determines that there is enough data in VCI 65 and that it should begin DMA'ing the data into host memory, RX load 62 writes VCI 65 into schedule queue 66 in step 704. At this point, RX load 62 begins processing the next data. In step 705, once VCI 65 has been written into schedule queue 66, unload 60 begins its processing of the data.

RX unload 60 is partitioned similarly to RX load 62. In step 706, RX unload 60's unload look-ahead 68 retrieves VCI 65 out of schedule queue 66 and looks up VCI 65 in DMA state 64. In step 707, unload look-ahead 68 then obtains the first and last cell pointers and grabs the CRC from DMA state 64. Unload look-ahead 68 also retrieves the buffer pointer in host memory if available. If it is the first cell of the packet that is being processed, there will be no buffer pointer in DMA state 64. RX unload 60 also has a data engine 72 and get_buffer 70. In step 708, if unload look-ahead 68 reads DMA state 64 and finds that there is no buffer pointer, it instructs get_buffer 70 to obtain one. In step 709, get_buffer state machine 70 looks up the targeted buffer ring pointer from DMA state 64.

In step 710, if DMA state 64 indicates that VCI 12 is not targeted, then VCI 12 obtains a common pointer for the non-targeted buffer ring 581. Get_buffer state machine 70 looks up this buffer ring and retrieves a buffer from the kernel in host memory 50. In step 711, if a VCI is supposed to be targeted, get_buffer 70 goes to target data descriptor ring 580a–580m and looks for a buffer. If there is nothing there because the final destination of the packet has not given the kernel any buffers, get_buffer 70 automatically returns to the control RAM, reads the non-target buffer ring and grabs a buffer from non-target data descriptor ring 581 and has the router DMA the data into that buffer. In step 712, once get_buffer state machine 70 has a buffer, it places the buffer back in DMA state 64. The remainder of RX unload 60 is unaware of whether the buffer is targeted or non-targeted.

In step 713, once unload look-ahead 68 has a buffer, it instructs unload data engine 70 to read the data from external buffer memory 42 and places it in the buffer pointer. In the targeted case, the buffer pointer would be pointing to the final destination of the packet. In step 714, the data is then sent to host memory by DMA until the last cell arrives.

In step 715, when RX load 62 receives the last cell in the packet, it makes a notation in external buffer memory 42 indicating that it is the last cell. This notation is recognized by unload data engine 72 which in turn informs unload look-ahead 68 that the cell is the last cell in the packet. In step 716, unload look-ahead 68 takes the DMA state information which it has been using for the whole packet and writes it to RX completion ring 54 in host memory 50.

In step 717, the software uses the same information that the router has been using to determine whether or not the incoming packet is a targeted buffer and whether a targeted buffer pointer is available for the packet. In this way, the kernel may recognize that the data is already in its final destination in host memory 50 and does not need to be copied from the kernel to the destination process. In step 718, the software notifies the final destination that the packet has arrived in that destination.

Figure 8:
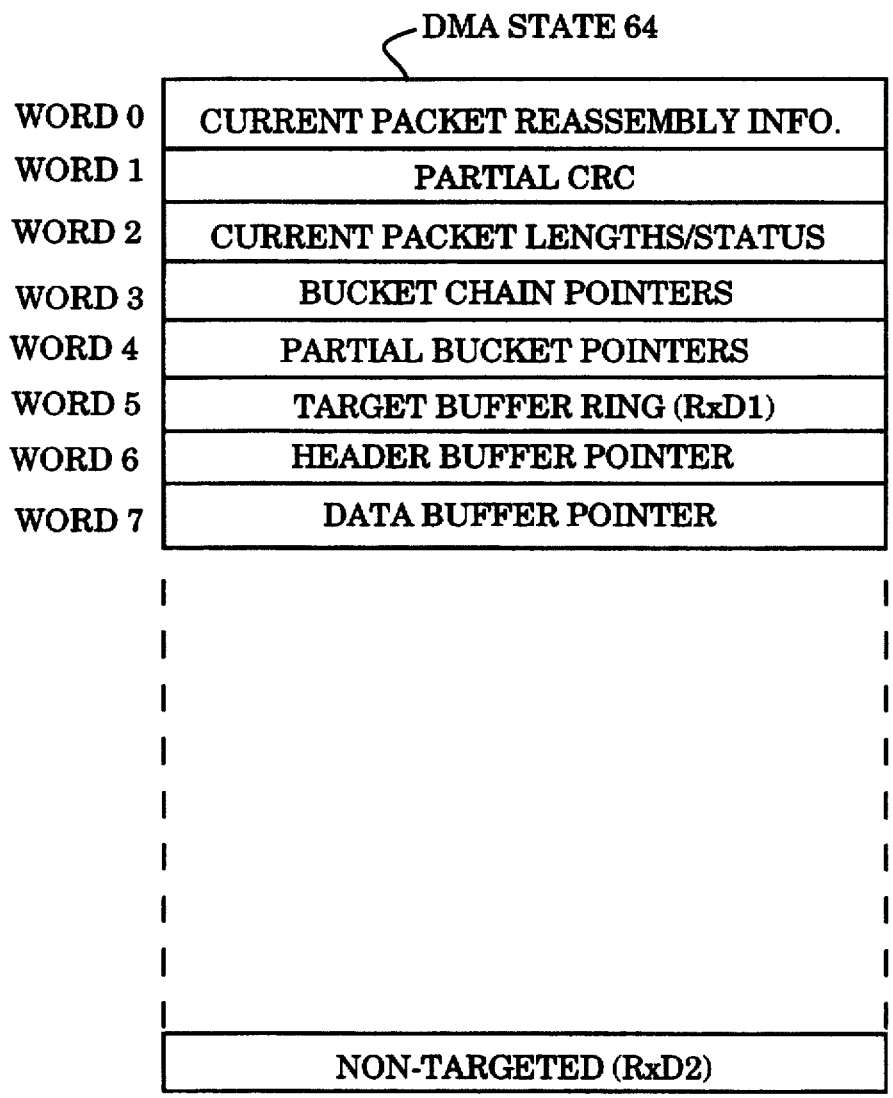
FIG. 8 illustrates an exemplary format for the DMA state of the receive block.

FIG. 8 illustrates an exemplary format for the DMA state for the receive block. In a preferred embodiment, each receives VCI's has eight words of state information which in the exemplary embodiment is stored in RX DMA state 64. The most active VCI's state information may be cached on a chip. Each VCI's entry in the embodiment is eight words long.

As mentioned above, most active VCI's state information is cached on the chip and the remainder are kept in external memory. In a preferred embodiment, each entry consists of eight words. More specifically, word zero may consist of current packet reassembly information. Word 1 may consist of partial CRC information. Word 2 may consist of current packet lengths and status information. Word 3 may consist of bucket chain pointers. Word 4 may consist of partial bucket pointers. Word 5 may consist of targeted buffer ring pointer. Word 6 may consist of header buffer pointer and word 7 may consist of data buffer pointer.

Word 2 has a buffer valid bit. It indicates that the buffer address and length are valid. This bit is read as the OWN bit from that RX buffer descriptor. This field will be cleared when the buffer is returned to the RX completion ring.

Word 3 has a kernel abort field which indicates that the corresponding VCI was marked as targeted, but no buffer was available on the targeted buffer ring when the first cell of this packet arrived. Hence, the chip aborted to a kernel buffer ring. Word 3 also has a targeted field When set, this VCI's targeted and the buffer chain pointer is valid. If this field is not set, the kernel buffer ring is utilized instead.

More specifically, in an exemplary implementation, word 3 of DMA state 64 may have two bits. The first may be the targeted bit. If this targeted bit is set, it indicates that there is a targeted buffer ring. The other bit may be the kernel abort. As mentioned earlier, the kernel abort bit indicates that the corresponding VCI was supposed to be a targeted buffer ring. For example, if the router went to RX D1 and did not find any buffer there, the router may abort to RX D2. From that point on, the router simply goes directly to RX D2 each time a cell arrives, until the software indicates that the router should start looking at RX D1 again. Word 3 in other words controls whether the VCI in this particular state is targeted. If it is targeted, then word 5 of DMA state 64 has a targeted buffer ring pointer. Unload 60 is the only piece of router involved with interaction. Write buffer of unload look-ahead 68 looks ahead and reads the DMA state information from DMA state 64. Word 3 may also have a buffer valid bit. When unload 60 reaches the DMA state, if the buffer valid bit is set, this indicates that the router has already picked up a buffer and it can send data into this buffer by DMA.

Word 6 and word 7 hold the pointers to the actual buffer. If the buffer valid bit in word 3 is set to 0, then get_buffer looks at the targeted bits and the kernel abort bits in word 3. If targeted bit is 1 and kernel abort is 0, then get_buffer reads word 5 of DMA state 64 which will be a pointer to RX D1. Get_buffer 70 then performs a read by DMA from the current descriptor from the address of word 5 and attempts to find a buffer there. Thus, get_buffer 70 reads from RX D1. If there is no buffer in RX D1, get_buffer 70 sets the kernel abort bit to 1 and goes to another place in RAM, a non-targeted ring such as RX D2. Get_buffer 70 goes to RX D2 and attempts to find a buffer. When it does read from RX D2, get_buffer 70 retrieves a few words of information which it places into words 6 and 7 of the buffer pointers. Get_buffer 70 then sets the buffer valid bit in word 3 and gives control back to unload look-ahead 68.

Figure 9:
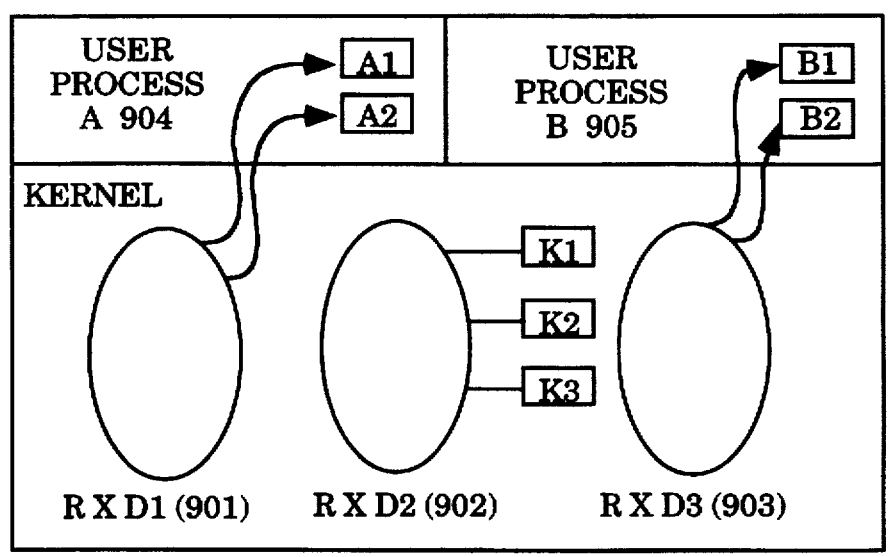
FIG. 9 illustrates an exemplary application of the present invention of transferring incoming packets directly to its destination.
Figure 10:
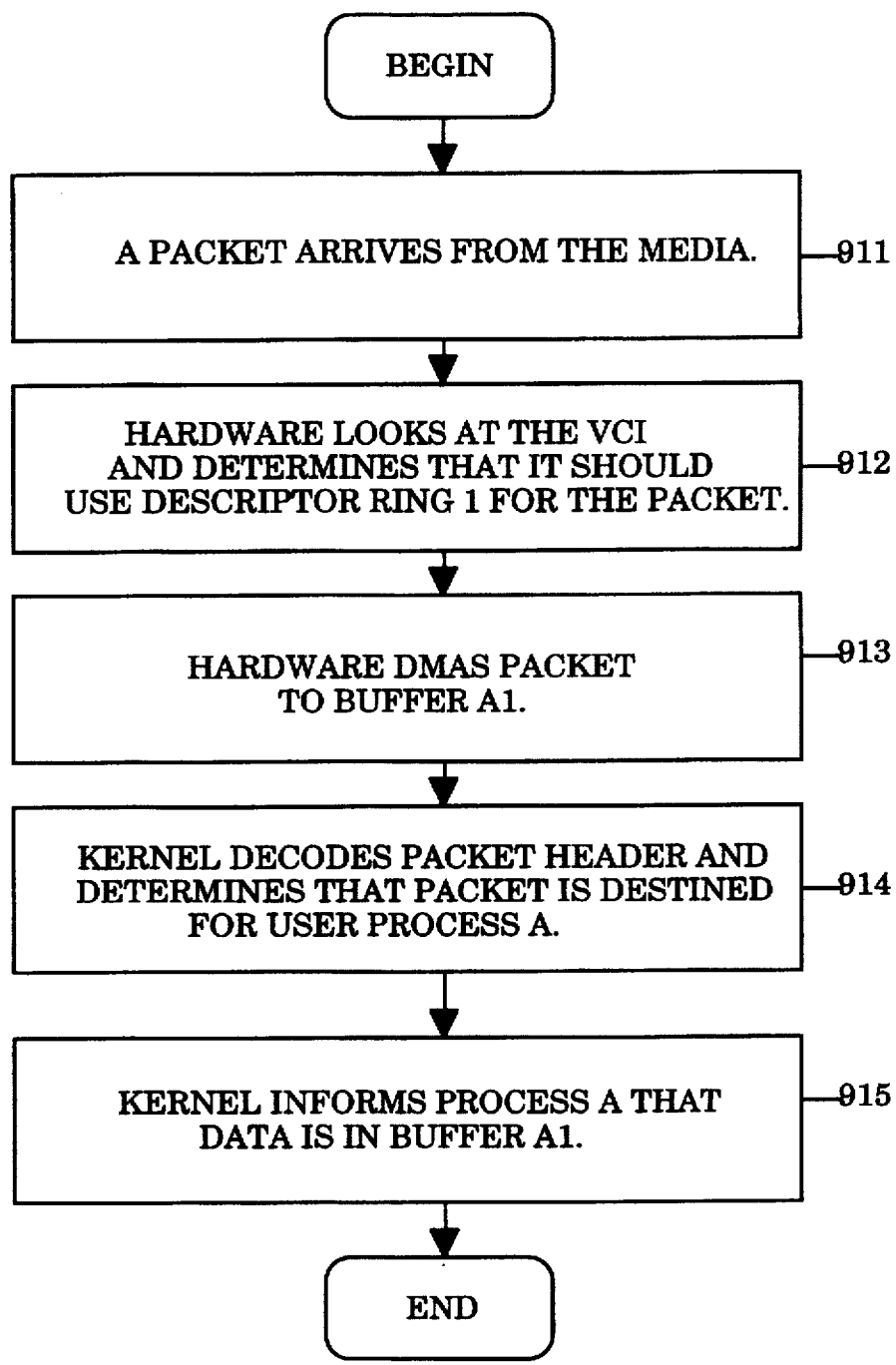
FIG. 10 is a flow diagram illustrating the general steps followed by an exemplary implementation of the present invention as illustrated in FIG. 9.

FIGS. 9 and 10 illustrate an exemplary application of the present invention. The general steps followed in the exemplary application will be illustrated in FIG. 10 and the accompanying description. The kernel has descriptor ring D1 (901), D2 (902) and D3 (903). Descriptor ring D1 (901) has buffer descriptors pointing to buffer A1 and buffer A2 of user process A (904). Descriptor ring D3 (903) has buffer descriptors pointing to buffers B1 and B2 of user process B (905).

FIG. 10 is a flow diagram illustrating the general steps followed by an exemplary implementation of the present invention. References will be made to the components illustrated in FIG. 9. In step 911, a packet arrives from the media. In step 912, router looks at the VCI and determines that the VCI should use RX D1 (901) for the packet as previously arranged by the software. In step 913, the router writes the packet to buffer A1 by DMA of user process A (904). In step 914, the kernel decodes the packet header and determines that the packet is destined for user process A (904). In step 915, the kernel informs process A 904 that data is in buffer A1.

Figure 11:
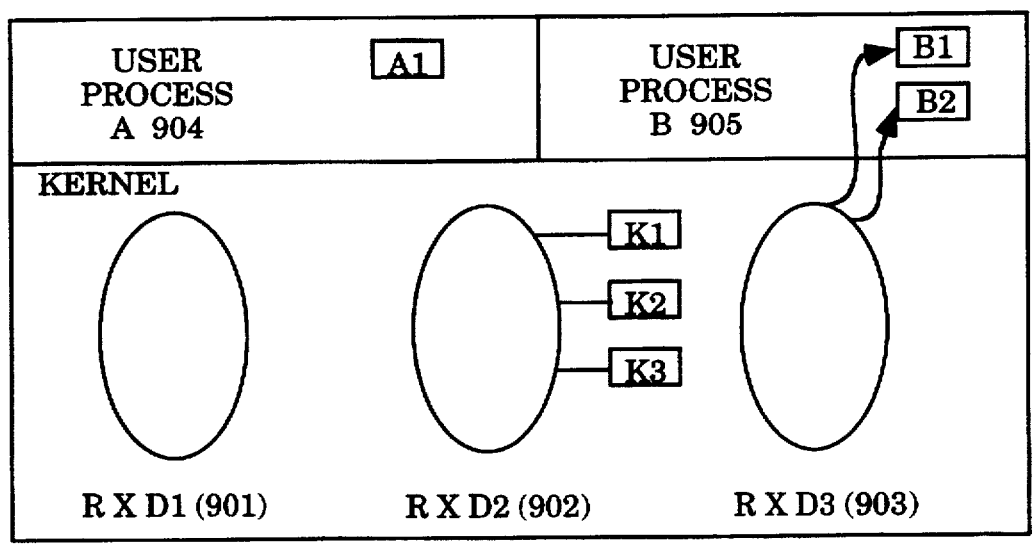
FIG. 11 illustrates an exemplary implementation of the present invention under an abort condition.
Figure 12:
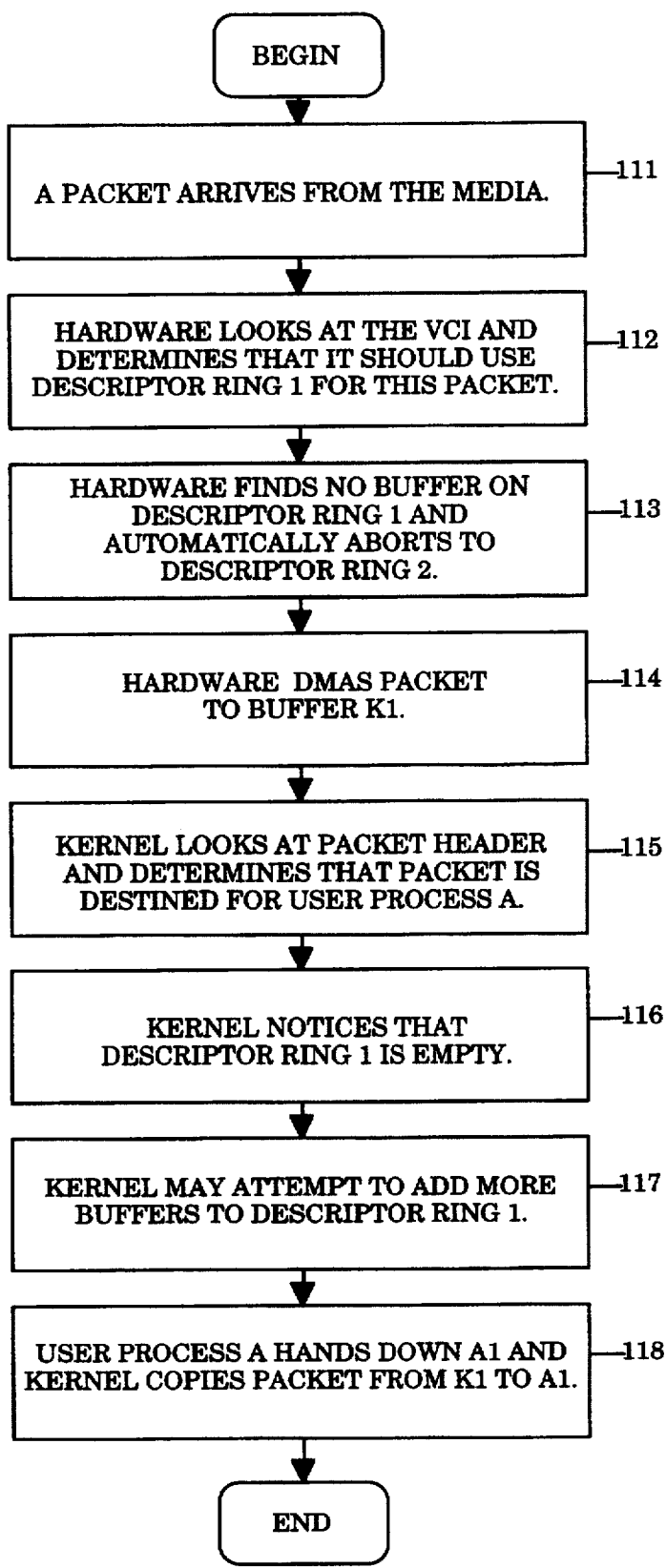
FIG. 12 is a flow diagram illustrating the general steps followed by an exemplary implementation of the present invention under an abort condition.

FIGS. 11 and 12 illustrate an exemplary implementation of the present invention under an abort condition. The general steps followed in the exemplary implementation will be illustrated in FIG. 12 and the accompanying description. The kernel has descriptor ring D1 (901), D2 (902) and D3 (903). Descriptor ring D3 (903) has buffer descriptors pointing to buffers B1 and B2 in user process 905.

FIG. 12 is a flow diagram illustrating the general steps followed by an exemplary implementation of the present invention under an abort condition. References will be made to components illustrated in FIG. 11. In step 111, a packet arrives from the media. In step 112, the router looks at the VCI and determines that the VCI should use RX D1 (901) for the packet as previously arranged by the software.

In step 113, the router finds no buffer on RX D1 (901) and automatically aborts to RX D2 (902). RX D2 (902) is non-targeted. In step 114, the router sends the packet into buffer K1 by DMA. In step 115, the kernel looks at packet header and determines that the packet is destined for user process A 904. In step 116, the kernel notices that RX D1 (901) is empty. In step 117 kernel attempts to add more buffers to RX D1 (901). In step 118, user process A 905 hands down buffer A1 and the kernel copies the packet from K1 to A1.

What has been described is a method and an apparatus for efficiently transferring data to the host memory in a system without requiring unnecessary or redundant copying of transferred information from one area of the host memory to another.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for reducing data copying overhead comprising the steps of:

receiving a packet to be routed to a final destination, said packet having routing information which includes direct memory access information; and writing data of said packet to a private buffer associated with the final destination if said direct memory access information refers to a target buffer descriptor as being provided for said packet, said target buffer descriptor pointing directly to a private buffer of said packet's final destination.

2. The method of claim 1 wherein said step of receiving further comprises the steps of:

demultiplexing information in a header portion of said packet to retrieve routing information for said packet including direct memory access information; and storing said direct memory access information of said packet in a RX load register.

3. The method of claim 2 further comprising the steps of:

loading data of said packet into external buffer memory; and writing a virtual channel identifier of said packet to a schedule queue once there is enough data in said virtual channel identifier and said data may be direct memory accessed to a host memory.

4. The method of claim 1 wherein said step of direct memory accessing further comprises the steps of:

retrieving said virtual channel identifier from said schedule queue and looking up a corresponding direct memory access state; and retrieving said direct memory access information from said direct memory access state.

5. The method of claim 4 further comprising the step of obtaining a buffer pointer if there is no buffer pointer indicated in said direct memory access information.

6. The method of claim 4 further comprising the step of looking up targeted buffer pointer ring if indicated in said direct memory access information.

7. The method of claim 6 further comprising the steps of:

obtaining a common buffer if said virtual channel identifier indicates a non-target buffer ring; and obtaining a private buffer if said virtual channel identifier indicates a target buffer ring and said private buffer is available.

8. The method of claim 7 wherein said step of obtaining a private buffer further comprises the step of obtaining said common buffer if no private buffer is available.

9. The method of claim 7 further comprising the steps of:

placing said buffer in said direct memory access state;

placing said data of said packet in said buffer pointer; and direct memory accessing said data to said host memory until all cells of said packet are direct memory accessed to said host memory.

10. The method of claim 9 further comprising the step of writing said direct memory access information for said packet into a completion ring in said host memory.

11. The method of claim 10 further comprising the steps of:

identifying whether said packet is target or non-target from said direct memory access information once said data for said packet is direct memory accessed; and notifying said final destination that said packet has arrived.

12. An apparatus for reducing data copying overhead comprising:

a host memory having one or more target and non-target buffers for storing data of in-coming packets sent to said host memory, said packet having routing information including direct memory access information; and an unload mechanism coupled to said host memory for sending said packet to a final destination in said host memory according to said direct memory access information, said direct memory access information indicating whether said unload mechanism is to use a target buffer descriptor pointing directly to a target buffer of said packet's final destination to send said packet to said host memory, said final destination being notified of arrival of said packet in said target buffer once said packet is sent to said final destination.

13. The apparatus of claim 12 wherein said unload mechanism is coupled to a load mechanism for storing direct memory access information of said packet once said packet is received from an origin.

14. The apparatus of claim 13 wherein said unload mechanism and said load mechanism are coupled to a direct memory access state buffer storing said direct memory access information.

15. The apparatus of claim 13 further comprising an external buffer memory coupled to said unload mechanism and said load mechanism through an external buffer memory interface, said external buffer memory for storing said data of said packet.

16. The apparatus of claim 15 further comprising a schedule queue coupled to said lo ad mechanism and said unload mechanism, said schedule queue for holding a virtual channel identifier of said packet, said virtual channel identifier being written into said schedule queue once there is enough data in said virtual channel identifier and said data may be sent to said host memory.

17. The apparatus of claim 12 wherein said unload mechanism further comprises an unload look-ahead mechanism coupled to said direct memory access state buffer and said schedule queue, said unload look-ahead mechanism for retrieving said virtual channel identifier from said schedule queue, looking up corresponding direct memory access state, for retrieving said direct memory access information from said direct memory access state and writing said direct memory access information for said packet into a completion ring in said host memory after data for said packet has been direct memory accessed to a buffer in said host memory.

18. The apparatus of claim 12 wherein said unload mechanism further comprises a get buffer mechanism coupled to said direct memory access state buffer, said get buffer mechanism for obtaining a buffer pointer if there is no buffer pointer indicated in said direct memory access information, for looking up targeted buffer pointer ring if indicated in said direct memory access information, for obtaining a common buffer if said virtual channel identifier indicates a non-target buffer ring, for obtaining a private buffer if said virtual channel identifier indicates a target buffer ring and said private buffer is available, for obtaining said common buffer if said direct memory access information indicates a target buffer but no private buffer is available and placing said buffer in said direct memory access state.

19. The apparatus of claim 18 wherein said unload mechanism places said data of said packet in said buffer pointer and sends said data to said host memory until all cells of said packet are direct memory accessed to said host memory.

20. The apparatus of claim 19 further comprising a kernel in said host memory for identifying whether said packet is target or non-target from said direct memory access information once said data for said packet is sent and for notifying said final destination in said host memory that said packet has arrived.

21. A system for reducing data copying overhead comprising:

a host memory having one or more target and non-target buffers for storing data of in-coming packets sent to said host memory, said packet having routing information including direct memory access information; and an unload mechanism coupled to said host memory for sending said packet to a final destination in said host memory according to said direct memory access information, said direct memory access information indicating whether said unload mechanism is to use a target buffer descriptor pointing directly to a target buffer of said packet's final destination to send said packet to said host memory, said final destination being notified of arrival of said packet in said target buffer once said packet is sent to said final destination; and a processor coupled to said host memory for processing said sending said packet to said host memory.

22. The system of claim 21 wherein said unload mechanism is coupled to a load mechanism for storing direct memory access information of said packet once said packet is received from an origin.

23. The system of claim 22 wherein said unload mechanism and said load mechanism are coupled to a direct memory access state buffer storing said direct memory access information.

24. The system of claim 23 further comprising an external buffer memory coupled to said unload mechanism and said load mechanism through an external buffer memory interface, said external buffer memory for storing said data of said packet.

25. The system of claim 24 further comprising a schedule queue coupled to said load mechanism and said unload mechanism, said schedule queue for holding a virtual channel identifier of said packet, said virtual channel identifier being written into said schedule queue once there is enough data in said virtual channel identifier and said data may be direct memory accessed to said host memory.

26. The system of claim 21 wherein said unload mechanism further comprises an unload look-ahead mechanism coupled to said direct memory access state buffer and said schedule queue, said unload look-ahead mechanism for retrieving said virtual channel identifier from said schedule queue, looking up corresponding direct memory access state, for retrieving said direct memory access information from said direct memory access state and writing said direct memory access information for said packet into a completion ring in said host memory after data for said packet has been direct memory accessed to a buffer in said host memory.

27. The system of claim 21 wherein said unload mechanism further comprises a get buffer mechanism coupled to said direct memory access state buffer, said get buffer mechanism for obtaining a buffer pointer if there is no buffer pointer indicated in said direct memory access information, for looking up targeted buffer pointer ring if indicated in said direct memory access information, for obtaining a common buffer if said virtual channel identifier indicates a non-target buffer ring, for obtaining a private buffer if said virtual channel identifier indicates a target buffer ring and said private buffer is available, for obtaining said common buffer if said direct memory access information indicates a target buffer but no private buffer is available and placing said buffer in said direct memory access state.

28. The system of claim 27 wherein said unload mechanism places said data of said packet in said buffer pointer and direct memory accesses said data to said host memory until all cells of said packet are sent to said host memory.

29. The system of claim 28 further comprising a kernel in said host memory for identifying whether said packet is target or non-target from said direct memory access information once said data for said packet is sent and for notifying said final destination in said host memory that said packet has arrived.

* * * * *